J. KONIGSBERG.
GUIDE FOR PIPE CUTTERS.
APPLICATION FILED MAY 8, 1919.
1,312,187.
Patented Aug. 5, 1919.
2 SHEETS—SHEET 1.
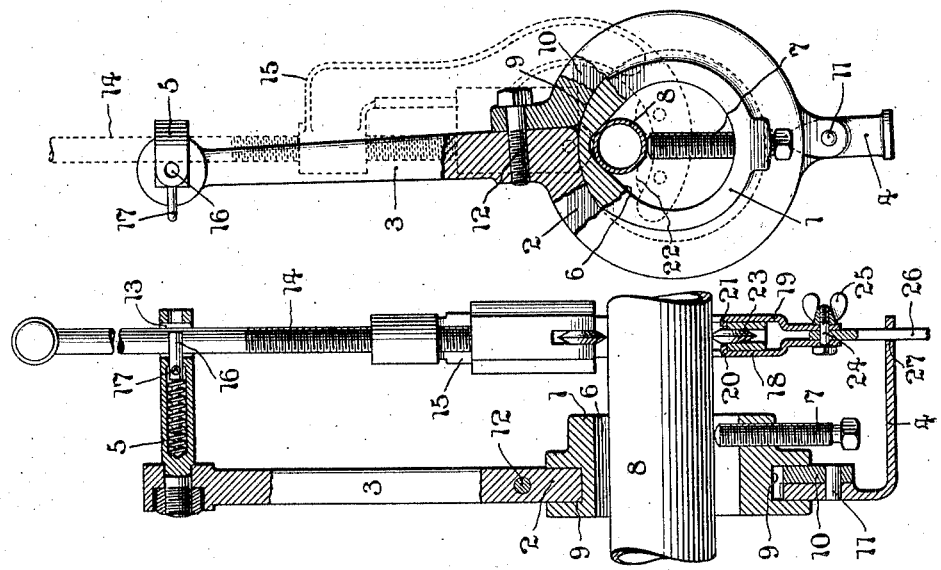
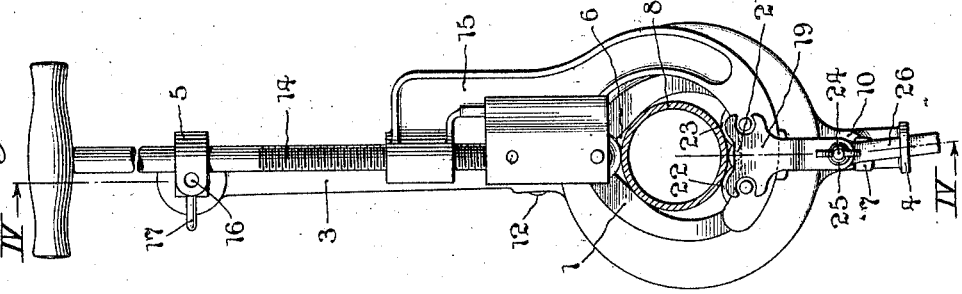
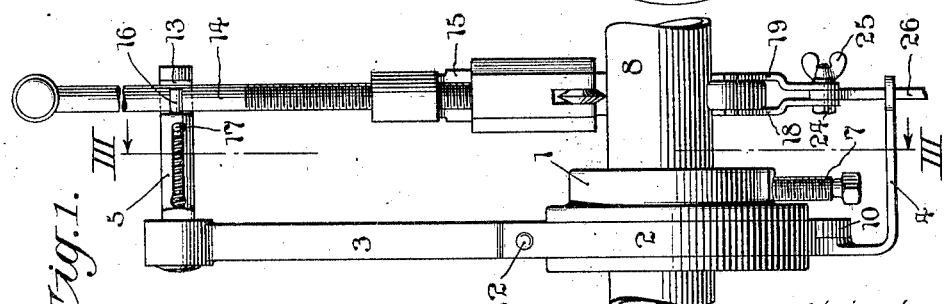
Inventor: Joseph Konigsberg
by attorneys

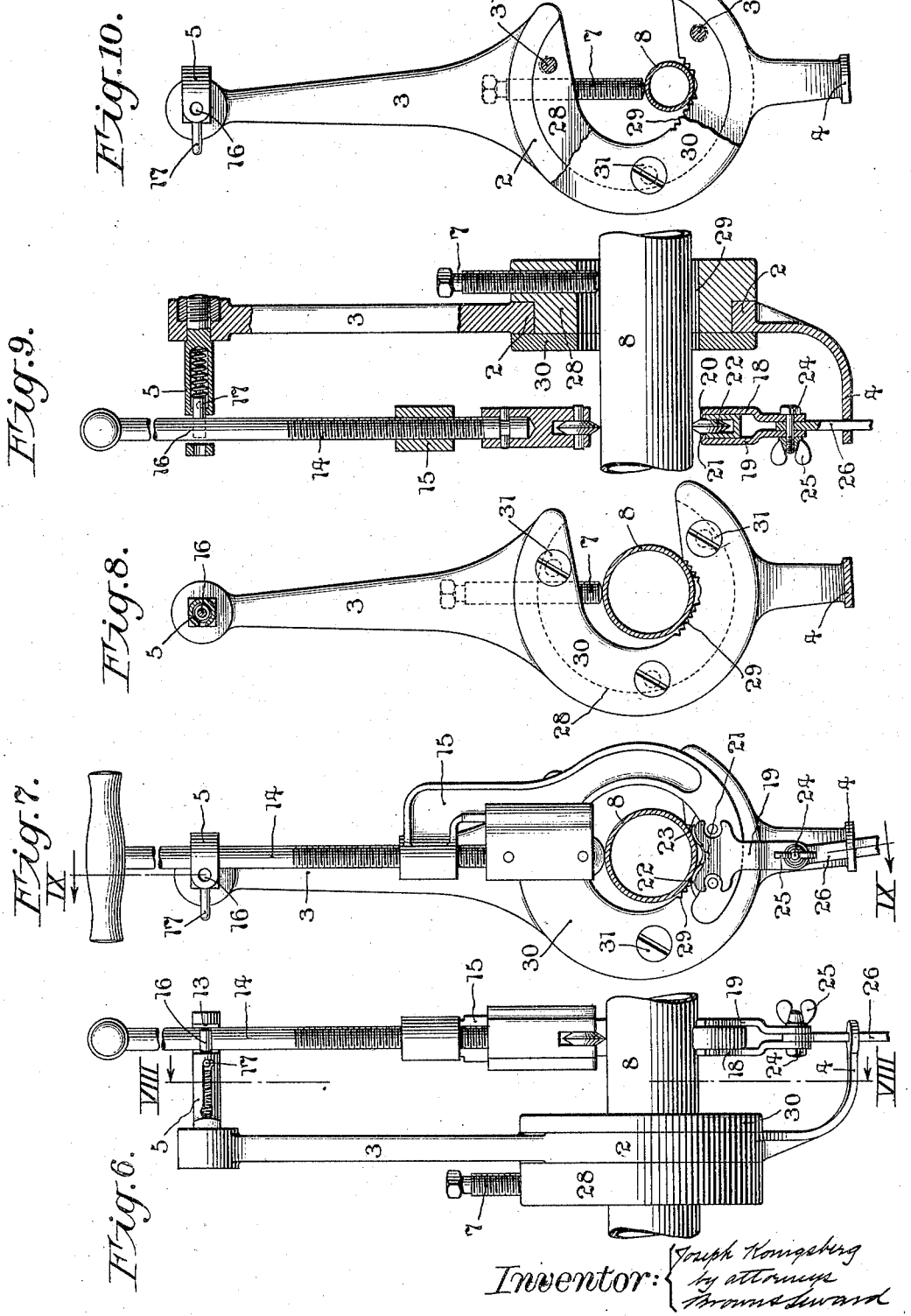

UNITED STATES PATENT OFFICE.

JOSEPH KONIGSBERG, OF NEW YORK, N. Y., ASSIGNOR TO LENA KONIGSBERG, OF NEW YORK, N. Y.

GUIDE FOR PIPE-CUTTERS.

1,312,187. Specification of Letters Patent. Patented Aug. 5, 1919.

Application filed May 8, 1919. Serial No. 295,523.

*To all whom it may concern:*

Be it known that I, JOSEPH KONIGSBERG, a citizen of the United States, and resident of the borough of Bronx, city and State of New York, have invented a new and useful Guide for Pipe-Cutters, of which the following is a specification.

This invention relates to a guide for pipe cutters and has for its object to provide a device which will hold the pipe cutter at right angles to the pipe so that the cutters in their path around the pipe will make a true and square cut.

A further object is to provide certain improvements in the form, construction and arrangement of the several parts of the device whereby the above mentioned object and other features of advantage may be effectively attained.

Practical embodiments of my invention are represented in the accompanying drawings in which, Figure 1 represents a side elevation of my improved device applied to a piece of pipe.

Fig. 2 represents a front elevation of the same.

Fig. 3 represents a vertical section taken in the plane of the line III—III of Fig. 1, looking in the direction of the arrows.

Fig. 4 represents a vertical section taken in the plane of the line IV—IV of Fig. 2, looking in the direction of the arrows.

Fig. 5 represents a front elevation of the device, partly in section, as applied to a pipe of smaller diameter than that shown in the preceding views, the cutter being represented in dotted outline.

Fig. 6 represents a side elevation of a modified form of device.

Fig. 7 represents a front elevation of the same.

Fig. 8 represents a vertical section taken in the plane of the line VIII—VIII of Fig. 6, looking in the direction of the arrows.

Fig. 9 represents a vertical section taken in the plane of the line IX—IX of Fig. 7, looking in the direction of the arrows, and Fig. 10 represents a front elevation of the device having certain of the parts broken away and in section, as applied to a pipe of small diameter, and the pipe cutter removed.

In the form shown in Figs. 1 to 5 inclusive, the device comprises a collet denoted by 1, a strap by 2, having diametrically disposed arms 3—4 and a swivel 5 carried by the arm 2. The collet 1 has an irregular shaped hole 6 therethrough, so that pipes of various diameters may be accommodated therein. The collet is also provided with a screw 7 threaded therein, which is arranged to engage the pipe 8 and force it against the wall of the hole 6, thereby securely fastening the collet to pipe. An annular groove 9 is provided in the collet for the reception of the strap 2, which has a swinging member 10 hinged at 11 and secured to the arm 3 by a bolt 12. The swivel 5 is mounted in the outer end of the arm 3 and is provided with a recess 13 arranged to receive the handle 14 of the pipe cutter frame 15 which is of well known and approved construction. The handle 14 is held in the recess 13 by means of a spring actuated plunger 16, housed in the swivel 5 with its free end projecting across the recess. A pin 17 is secured to the plunger 16 by which it may be manipulated.

The pipe cutter frame 15 is guided by means of a removable device secured thereto, which device comprises side plates 18—19, which have inwardly disposed lugs 20—21 arranged to overhang and engage the pipe cutter frame between the cutters 22—23. These plates are held in position by means of a bolt 24 and thumb nut 25. A guide bar 26 is interposed between the plates and fulcrumed on the bolt 24. The lower end of the guide-bar 26 is arranged to reciprocate in a slot 27 in the arm 4.

In the form shown in Figs. 6 to 10 inclusive, the collet 28 has one side open to receive the pipe to be cut and provided with teeth 29 which engage the pipe when clamped therein. The strap 2 is also cut away to coincide with the open portion of the collet, and held in rotatable engagement with the collet by a plate 30 secured to the collet by screws 31.

Assuming the pipe cutter is placed on the pipe at the point where the pipe is to be cut, and the collet loosely mounted on the pipe in position to receive the strap 2, which is rotatably fixed thereto by the bolt 12, the collet, arm and swivel are brought to a position where the handle 14 may be placed in the recess 13 and the guide bar 26 and plates 18—19 located in position on the cutter frame with the guide bar in the slot 27. After the parts are in proper order the screw 7 may be brought to bear on the pipe and the collet firmly secured to the pipe. The cutting of the pipe is performed in the usual manner and the cutter is guided by the parts coacting with the cutter and the strap rotating in the groove of the collet. The handle of the cutter is held by the arm 3 and swivel 5 while the cutter frame is guided by the plates and the guide bar working in the slot 27 in the arm 4, which is in alinement with the recess 13 in the swivel 5. Thus it will be seen that both ends of the cutter are guided thereby assuming a true and square cut at right angles to the pipe.

While I have shown in Figs. 1 to 4 and 6 to 9 inclusive, a guide bar 26 coacting with the arm 4, I wish it understood that the guide bar may be omitted, as shown in Fig. 5, and the device be operated with equally as good effect.

It will be also understood that various changes may be resorted to in the form, construction, and arrangement of the several parts, without departing from the spirit and scope of my invention; and hence I do not intend to be limited to the specific details herein shown and described except as they may be included in the claims.

What I claim is:

1. A guide for pipe cutters comprising, a collet for the pipe to be cut, a strap rotatably mounted on said collet, an arm on said strap and a swivel on said arm for receiving the handle of the pipe cutter.

2. A guide for pipe cutters comprising, a collet for the pipe to be cut, a hinged strap rotatably mounted on said collet, an arm on said strap, and a swivel on said arm for receiving the handle of the pipe cutter.

3. A guide for pipe cutters comprising, a collet having an elongated opening for accommodating pipes of different diameters to be cut, a strap rotatably mounted on said collet, an arm on said strap, and a swivel on said arm for receiving the handle of the pipe cutter.

4. A guide for pipe cutters comprising, a collet for the pipe to be cut, means for securing said collet to the pipe, a strap rotatably mounted on said shaft, an arm on said strap, and a swivel on said arm for receiving the handle of the pipe cutter.

5. A guide for pipe cutters comprising, a collet for the pipe to be cut, means for securing said collet to the pipe, a strap rotatably mounted on the collet, an arm on said strap, a swivel on said arm for receiving the handle of the pipe cutter, and means on the swivel for locking the handle therein.

6. A guide for pipe cutters comprising, a collet for the pipe to be cut, means for securing said collet to the pipe, a strap rotatably mounted on the collet, an arm on said strap, a swivel on said arm for receiving the handle of the pipe cutter, and a spring actuated means on the swivel for locking the handle therein.

7. In combination, a pipe cutter and a guide therefor comprising, a collet for the pipe to be cut, means for securing said collet to the pipe, a strap rotatably mounted on the collet, arms diametrically opposed on said strap, one of said arms having a swivel for receiving the handle of the pipe cutter, and a guide bar carried by the pipe cutter adapted to engage the other arm for holding the cutter in alinement with the strap.

8. In combination, a pipe cutter and a guide therefor comprising, a collet for the pipe to be cut, means for securing said collet to the pipe, a strap rotatably mounted on the collet, arms diametrically opposed on said strap, one of said arms having a swivel for receiving the handle of the pipe cutter, and a guide bar removably secured to the pipe cutter and adapted to engage the other arm for holding the cutter in alinement with the strap.

9. In combination, a pipe cutter and a guide therefor comprising, a collet for the pipe to be cut, means for securing said collet to the pipe, a strap rotatably mounted on the collet, arms diametrically opposed on said strap, one of said arms having a swivel for receiving the handle of the pipe cutter, side plates carried by the cutter and a guide bar carried by the side plates in position to engage the other arm for holding the cutter in alinement with the strap.

10. In combination, a pipe cutter and a guide therefor comprising, a collet for the pipe to be cut, means for securing said collet to the pipe, a strap rotatably mounted on the collet, arms diametrically opposed on said strap, one of said arms having a swivel for receiving the handle of the pipe cutter, side plates, a guide bar, and a common means for securing the side plates to the cutter and the guide bar to the side plates, said guide bar being adapted to engage the other arm for holding the cutter in alinement with the strap.

In testimony that I claim the foregoing as my invention, I have signed my name this 28th day of April, 1919.

JOSEPH KONIGSBERG.